United States Patent [19]

Lawrence et al.

[11] 4,192,468
[45] Mar. 11, 1980

[54] FEED ROLL ASSEMBLY FOR A FORAGE HARVESTER

[75] Inventors: Allan K. Lawrence; Merlyn D. Bass; Robert D. Black; Jerry L. Krafka, all of Ottumwa, Iowa

[73] Assignee: Deere & Company, Moline, Ill.

[21] Appl. No.: 922,029

[22] Filed: Jul. 5, 1978

[51] Int. Cl.² ............................................. B02C 18/22
[52] U.S. Cl. .............................. 241/101.7; 144/246 R; 241/222
[58] Field of Search .......................... 198/624; 271/80; 56/14.5, 16.4, 16.6, DIG. 1; 144/242 C, 246 R, 247; 83/436; 241/101.7, 221, 222, 223

[56] References Cited

U.S. PATENT DOCUMENTS

| 3,444,673 | 5/1969 | Evans | 241/222 X |
|---|---|---|---|
| 3,873,033 | 3/1975 | Tilby | 83/436 X |
| 4,069,981 | 1/1978 | Shah | 241/222 X |
| 4,073,377 | 2/1978 | Stoessel et al. | 198/624 |

*Primary Examiner*—Mark Rosenbaum

[57] ABSTRACT

Harvested crop material is fed to the cylindrical cutterhead of a forage harvester by a feeding assembly consisting of opposed pairs of upper and lower feed rolls. The articulated upper roll assembly floats to accommodate variations in the flow of crop material. The downstream upper feed roll is carried on a pair of opposite radius arms which are rigidly coupled by a transverse leveler shaft, providing a stable frame and minimizing cocking or twisting of the roll. A second pair of feed roll arms is pivotally connected to the radius arms and extends forward to support the upstream feed roll which is journaled on a shaft rigidly connected between the feed roll arms. A stop and biasing arrangement provides that each upper roll may float independently, the articulation of the feed roll assembly being such that upward movement of either roll or the rolls together is subject to the restoring force of a tension spring. However, upward movement of the upstream roll in relation to the downstream roll is restricted by a stop which limits rotational movement between the feed roll arms and the radius arms supporting the rolls.

32 Claims, 5 Drawing Figures

FEED ROLL ASSEMBLY FOR A FORAGE HARVESTER

BACKGROUND OF THE INVENTION

This invention relates to a feeding system for feeding crop material to a cutterhead, for example in a forage harvester, and more particularly to an articulation and control arrangement for a yieldably floating conveyor forming part of such a system.

Forage harvesters for removing material from a field, reducing its size or cut length and delivering it to a trailer or other collector are well known. In a very common type of machine, a feeding system transfers harvested crop material from a harvesting unit to a cylinder or reel-type cutterhead, the axes of the feed rolls or rotating members of the conveyor being parallel to the cutterhead axis and feeding the material to the cutterhead in a generally radial direction. Generally the cutterhead and its feeding system are housed between parallel generally upright opposite side walls and, typically, the feeding system consists of two opposed conveyor assemblies, one of which (usually the lower) is fixed in relation to the cutterhead while the other is free to float to increase feed opening to accommodate variations in flow of crop material but restrained by some resilient means so as to maintain pressure on the mat of material being fed and to ensure positive and efficient feeding. For convenience in this discussion it will be assumed that the upper conveyor is the yieldable one.

Typically, such a conveyor consists of generally cylindrical side-by-side rolls with their cylindrical surfaces treated (for example, provided with toothed axially extending ribs) to positively convey material, although an endless belt-type conveyor may be used in which an apron is drivingly supported on a plurality of rolls. The tendency of a yieldably floating upper conveyor assembly to cock or tilt due to lateral unevenness in the mat of crop material has long been a problem. Where cocking must be tolerated, extra clearances between the ends of the rolls and the side walls must be provided, possibly resulting in wrapping of the rolls and shafts with crop material, or loss of control of the mat being fed. Wear rates of drive components and bearings may also be increased. Various attempts have been made to provide support assemblies for the upper conveyor resistant to cocking and able to maintain roll alignment. These have included tieing or interconnecting opposite sides of the conveyor assembly adjacent the cutterhead, for example with a transverse shaft, journaled in support arms carrying the rolls and fitted with pinions at each end for engaging a mating rack attached to a side wall or frame. In another method, a torsionally stiff shaft journaled in the side walls or frame is connected to the opposite sides of the conveyor assembly by bell cranks and linkages. Such systems only partially solve the problem of cocking because they couple the opposite sides of the conveyor assembly only indirectly and their relative complexity introduces wear points and joint clearances, the slack of which must be taken up before uneven crop mat forces tending to lift one side of the conveyor can be transmitted from one side to the other so that both sides move in unison.

It is also known to provide a torsion member in an upper conveyor remote from the cutterhead but disposed externally and rearward of a forward feed roll and hence at a less mechanically advantageous point with regard to providing efficient torsional and bending resistance for a forward part of a conveyor subframe.

Another problem of forage harvesters has been to provide in the cutterhead feeding system a flexible, crop mat compressing upper conveyor assembly that is rapidly and smoothly responsive to changes in rate of crop flow and mat thickness and capable of applying uniform and steady pressure so that blockages and/or peak torque in the drive train are avoided. Many conveyor systems have relied on a slotted guide arrangement to provide part of the control of a floating conveyor movement with consequently somewhat unpredictable friction forces. Even in systems using only pivoted joints, the roll tensioning device has been applied indirectly by springs through rock shafts and linkages and with somewhat oblique direction of application of restraining force to a conveyor assembly subframe. Further, little attention has been given to optimizing the location of down stops for the upper conveyor assembly or provision of adjustment for them, or to provision of interlock means controlling relative movement between adjacent rolls of the upper conveyor assembly.

SUMMARY OF THE INVENTION

Accordingly, an object of this invention is to provide a yieldably floating conveyor assembly for the feeding system of the cutterhead of a forage harvester which articulates responsively and efficiently when handling variable flow rates and laterally uneven thicknesses of a mat of crop material. It is a further object that the system be simple and low in manufacturing cost and easy to assemble and adjust.

Tandem floating feed roll subassemblies may be provided, with a downstream assembly carried on radius arms extending alongside a cylindrical cutterhead to a pivot point towards the cutterhead axis with a feed roll supported by the radius arms being rotatably driven directly from the drive train of the forage harvester. Each radius arm may include a releasable clamp rigidly gripping a transverse torsion bar or leveler shaft which cooperates with the opposite radius arms to form a rigid U-shaped subframe for supporting and maintaining the alignment of a feed roll carried by it.

A somewhat similar upstream feed roll subassembly may be pivotally supported by the downstream assembly at a pivot axis adjacent to or coaxial with the downstream roll. The upstream roll may be supported in a pair of opposite feed roll arms and driven from the downstream roll, for example by conventional chain and sprocket drive in which case the upstream roll may be journaled on a dead shaft which may be connected rigidly at its ends to the opposite feed roll support arms, thus forming a second rigid U-shaped (forward) subframe for supporting and maintaining alignment of a feed roll supported by it. The tandem coupling of the downstream and upstream subframes permits them both to cooperate and contribute to providing a torsionally stiff non-twisting support to resist cocking of feed rolls carried by either one or both of them.

Both subframes are provided with down stops to maintain a minimum spacing between the rolls and their cooperating counterparts in a mating fixed conveyor assembly of a feeding system. A stop for a feed roll assembly may be made adjustable so that the minimum roll separation or feed opening may be adjusted to suit particular crop conditions. This adjustability is particularly useful in the case of the downstream rolls, which typically are less aggressive than the upstream rolls.

Means are provided to bias the yieldably floating conveyor towards the fixed conveyor assembly to maintain positive feeding. A linear acting means, such as a coil spring, may be used to provide the biasing force and if its line of action approximately perpendicularly bisects a line joining the centers of downstream and upstream rolls, a good balance of roll force is obtained, each roll being able to deflect independently away from the opposite conveyor without unduly affecting the force applied to the other roll.

A feature of the invention is the provision of a differential or rotation limiting stop between the upstream and downstream subframes so that only limited floating or separating movement of the upstream roll can take place after which the downstream roll is carried with the upstream roll, the whole yieldable conveyor assembly then pivoting as a rigid unit about the pivot axis of the downstream subframe. This is advantageous, for example in a forage harvester equipped with a reversible feeding assembly where, on resuming normal operating after a reversal (for example, to clear a blockage) the downstream feed rolls may be presented with the wall-like butt end of a previously sheared mat of material. Typically, the upstream rolls are larger in diameter and more aggressive than the downstream rolls and can accommodate such an offering, but the smaller less aggressive downstream rolls may be unable to "bite" and open to accept it. The rotation-limiting stop between upstream and downstream subassemblies in effect prepares the downstream rolls according to a signal from the upstream rolls.

Another feature of the invention is that a shield partially wrapping a downstream feed roll to redirect crop material carried over by the cutterhead and discharged adjacent the feed roll may be made integral with a downstream feed roll assembly sub-frame and, in particular, carried by the above-mentioned transverse torsion bar.

DESCRIPTION OF THE PREFERRED EMBODIMENT

Figure 1:
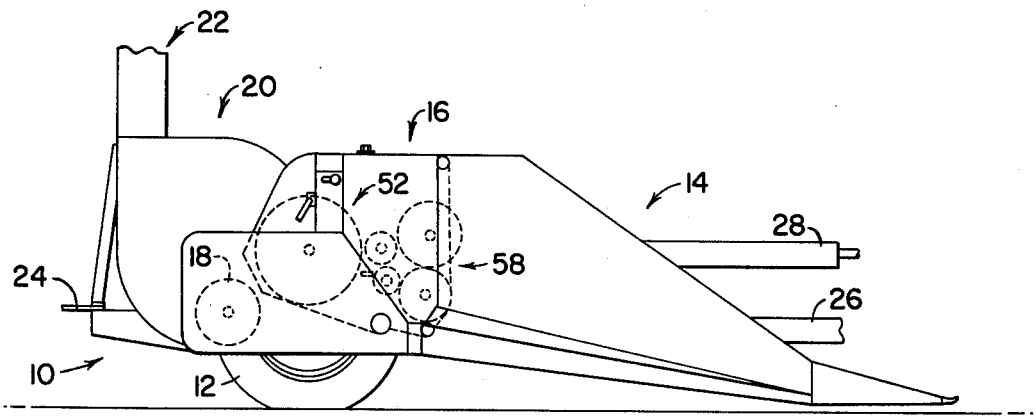
FIG. 1 is a semi-schematic side elevation of a forage harvester embodying the invention.

The invention is embodied in a forage harvester otherwise conventional, such as the pull-type machine illustrated in FIG. 1. The machine includes a main frame 10 supported above the ground on a pair of transport wheels 12. A forward harvesting unit such as the cornhead 14 illustrated delivers harvested crop material to a feeding and cutterhead assembly 16 which in turn delivers it to a transverse auger conveyor 18 whence a blower 20 discharges it through a discharge spout 22, only part of which is shown. Discharged material may be collected in a trailer (not shown) connected to a trailer hitch 24 on the harvester. The forage harvester is drawn and powered by a suitable tractor which is connected to a tongue 26 and a drive shaft assembly 28, only portions of which are shown in FIG. 1. A suitable drive train (not shown) transmits power from the drive shaft 28 to the components of the forage harvester.

Figure 2:
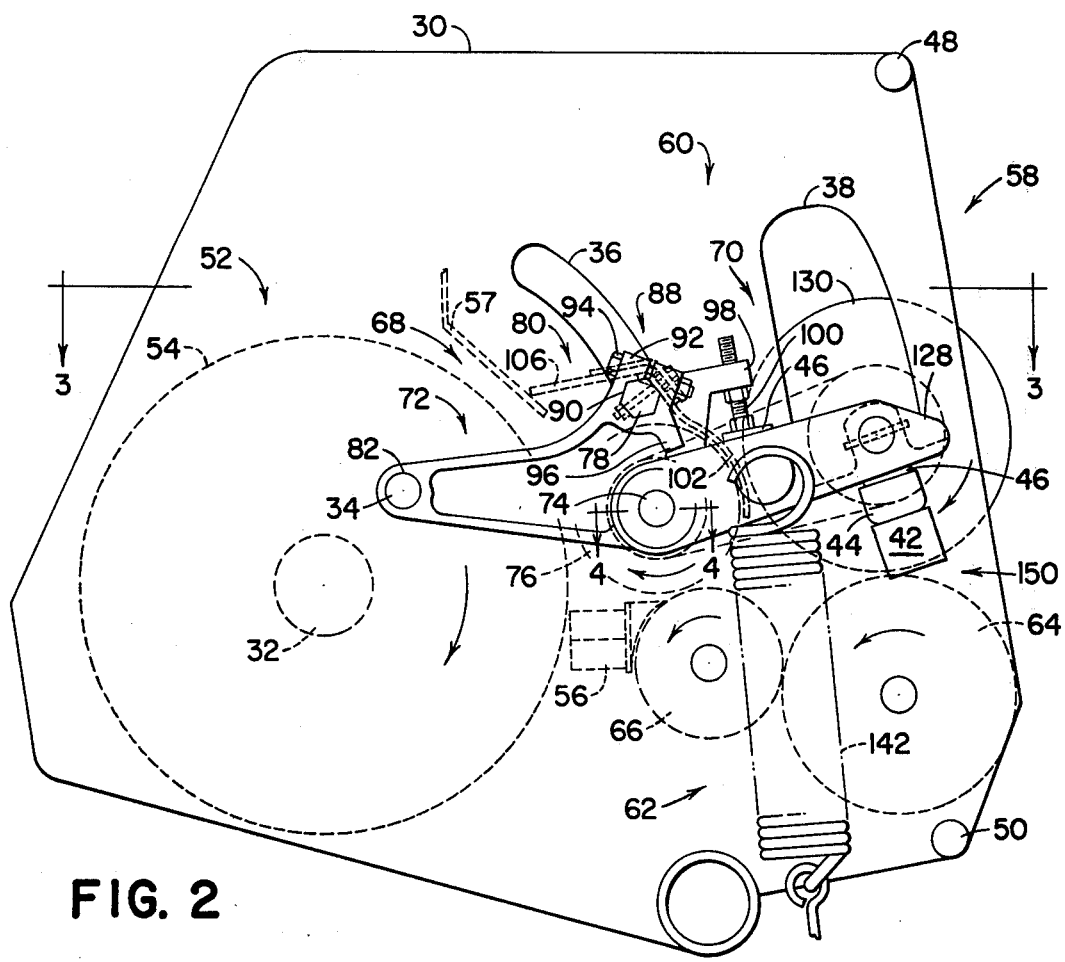
FIG. 2 is an enlarged semi-schematic side elevation of the forward portions of the feeding and cutterhead assemblies of the forage harvester.

The feeding and cutterhead assembly 16 is shown in more detail in FIG. 2 and includes a pair of generally similar but opposite left- and right-hand side sheet assemblies 30, spaced apart and generally upright, to house the feeding and cutterhead components. The side sheets 30 are suitably reinforced and supported on the forage harvester frame 10 by subframe members not discussed here. Each side sheet 30 includes a cutterhead cylinder bore and mount 32, indicated only schematically, a rigidly attached downstream feed roll assembly pivot 34, a generally arcuate downstream feed roll assembly clearance slot 36 centered on the pivot 34, and a larger irregularly-shaped upstream feed roll clearance slot 38.

Downstream feed roll and upstream feed roll downstop brackets 40 and 42 respectively are rigidly attached on the outer side of each opposite side sheet 30, the downstream bracket 40 being located between the feed roll assembly clearance slots 36 and 38 and the upstream downstop bracket 42 being approximately centered below the upstream slot 38. Each downstop bracket has rigidly attached to it on its upper side a cup 44 retaining a downstop bolster 46 made of some slightly resilient material such as hard rubber and projecting somewhat above the upper edge of the cup 44. Upper and lower harvesting unit support arms 48 and 50 respectively are carried by the opposite side sheets 30 adjacent their upper and lower forward corners.

Journaled between the lower rearward portion of the opposite side sheets 30 is a cutterhead assembly 52 which is generally conventional and includes a cylindrical cutterhead 54 (shown only in outline) carrying on its cylindrical periphery a plurality of helically disposed knives and which functions as is well known in cooperation with a stationary shear bar assembly such as that shown at 56. The cutterhead assembly also includes a casing member 57 wrapping the upper periphery of the cylinder and only a forward portion of which is shown (FIG. 2).

A feeding conveyor assembly 58, between the opposite side sheets 30 and immediately ahead or upstream of the cutterhead assembly 52 consists of a yieldably floating upper conveyor assembly 60 and immediately below it an opposing fixed lower conveyor assembly 62, the latter consisting of an upstream lower feed roll 64, and a smaller downstream lower feed roll 66 mounted closely adjacent the shear bar assembly 56. The treatment of the feed roll surfaces is conventional.

The upper feeding conveyor assembly 60 is pivotally mounted and articulated and consists of downstream and upstream feed roll assemblies 68 and 70 respectively. The downstream assembly 68 consists of a pair of opposite radius arms 72 extending alongside the outer surfaces of the opposite side sheets 30, a transversely extending feed roll shaft 74 and, carried rigidly and concentrically by the shaft a downstream upper feed roll 76, extending transversely between the opposite side sheets 30. The downstream feed roll assembly 68 also includes a transverse leveler shaft 78 and an anti-carryover shield 80.

Figure 4:
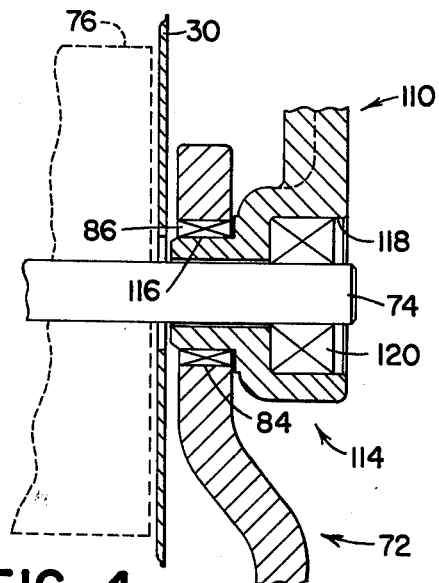
FIG. 4 is an enlarged partial sectional view taken approximately on line 4—4 of FIG. 2 showing the pivotal connection between the upstream and downstream feed roll assemblies.
Figure 5:
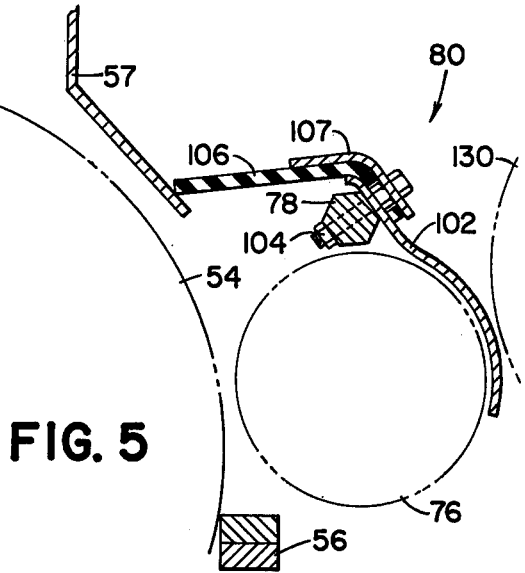
FIG. 5 is an enlarged partial sectional view approximately on line 5—5 of FIG. 3 showing the anti-carryover shield mounted on the leveler shaft.
Figure 4:
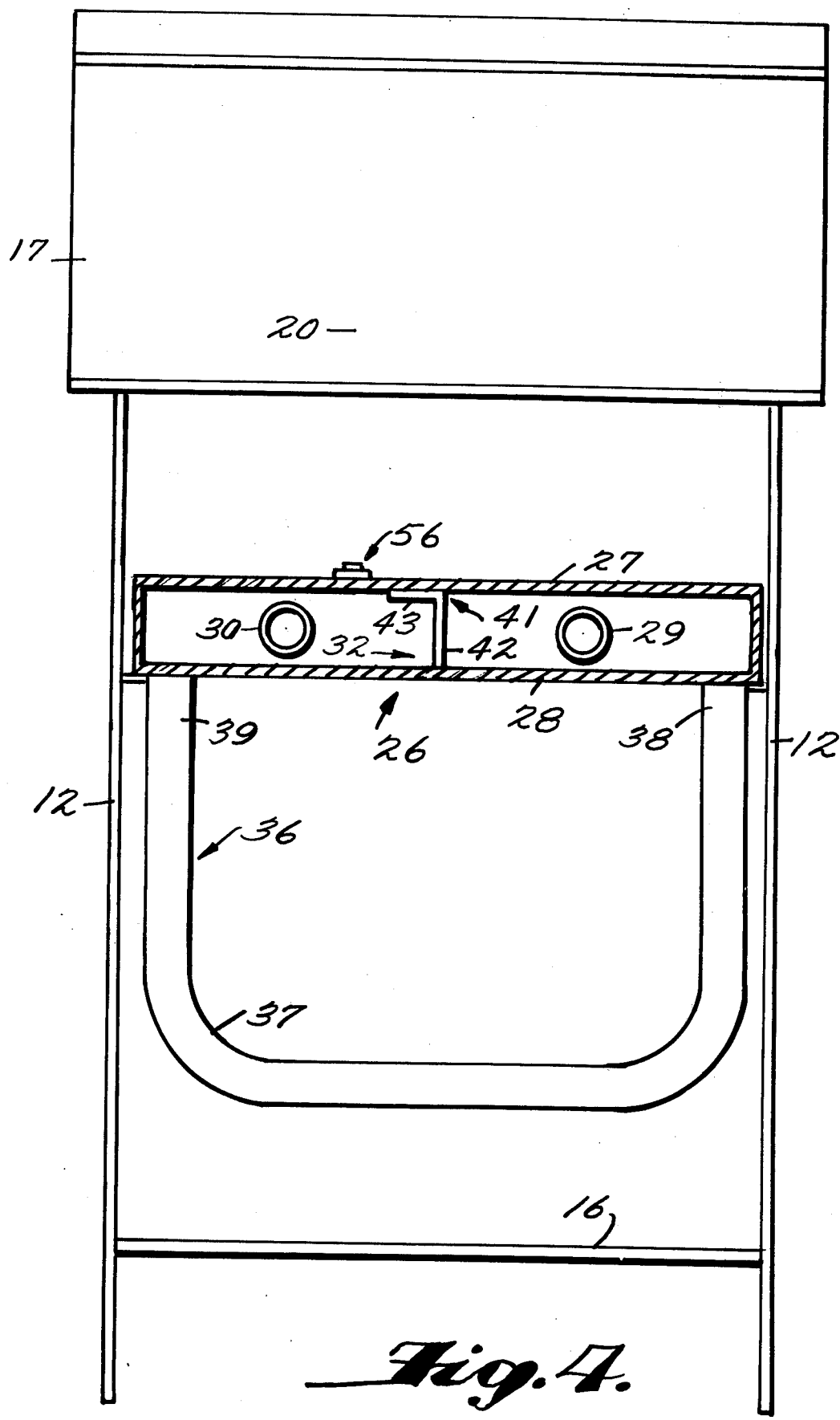

Each opposite radius arm 72 has at its downstream end a pivot bore 82 by which the radius arm 72 is journaled on the pivot 34 and a larger upstream pivot bore 84 which houses an anti-friction pivot bearing 86 (FIG. 4). The upper side of each forward or upstream portion of each radius arm 72 comprises a releasable shaft clamp portion 88 having a transversely extending bore 90 of hexagonal cross section embraced by a pair of opposing clamp ears 92 provided with a suitable fastener 94 for tightening the clamp. The hexagonal bore 90 is preferably broached to size so that the hexagonal leveler shaft 78 is easily assembled but gripped securely and rigidly when the clamp is tightened. Disposed somewhat forward of the axis of the upstream pivot bore 84 of the radius arm 72 is a rotational stop boss 96 (FIG. 2) protruding from the outer side of the radius arm and forming in effect a downward extension of the clamp portion 88 which itself extends laterally outwards from the outer side of each radius arm 72. An adjustable stop arm 98 is provided by a forward extension of the radius arm 72 and carries an adjustable threaded stop screw 100.

The anti-carryover shield 80 includes a main rigid arcuate portion 102 partially wrapping the downstream upper feed roll 76 extending laterally to fit closely between the opposite side walls 30 and circumferentially on the forward side of the roll 76 down to approximately the level of the roll axis and attached rigidly to the hexagonal leveler shaft 78 by suitable fastener assemblies 104. The shield 80 also includes a resilient flap 106 secured to the leveler shaft 78 by the fastener assemblies 104 and a retainer 107 and extending laterally so that its ends make sliding contact with the inner surfaces of the opposite side sheets 30 and rearwardly to end closely adjacent the casing member 57.

The upstream upper feed roll assembly 70 includes opposite left- and right-hand feed roll arms 108 and 110 respectively extending generally parallel but outside of the opposite side sheet assemblies 30 and supporting between them an upstream upper feed roll 112 journaled on a shaft 113. A laterally extended hub-like portion 114 at the downstream end of the right-hand feed roll arm 110 and seen best in FIG. 4 includes a boss 116 journaled in the pivot bearing 86 of the radius arm 72 and, laterally outward of the boss 116, a concentric bore 118 housing an anti-friction bearing 120 in which the shaft 74 of the downstream upper feed roll 76 is journaled. A forward portion 122 of the feed roll arm 110 is somewhat hub-shaped, cross drilled to and bored to receive the downstream upper feed roll shaft 113, the shaft being a tight fit in the right-hand feed roll arm 110, with a drive pin 124 being used for additional security so that a structurally rigid connection is made between the shaft 113 and the feed roll arm 110. Extending laterally outwards from the feed roll arm 110 approximately midway between the rear and forward hub portions 114 and 122 respectively is a tension spring boss 126. A toe portion 128 of the feed roll arm 110 extends forwardly of the forward hub portion 122.

The upstream upper feed roll 112 includes, as well as a roll portion 130 extending between the opposite side sheets 30, bearing sleeves 132 rigidly and concentrically attached to its opposite ends and extending outwards through the side sheet 30. Each sleeve 132 houses a bearing 134 for journaling the roll assembly 112 on the fixed or dead shaft 113. A feed roll drive sprocket 136 is attached rigidly at the outer end of the left-hand sleeve 132.

The left-hand upstream feed roll arm 108 is generally similar to the right-hand arm 110, including being rigidly connected to an end of the feed roll shaft 113, but it has an offset 138 to provide space for a chain drive for the upstream feed roll 112 and also includes a chain tightener mounting boss 140.

A pair of tension springs 142, each hooked at one end over the spring bosses 126 of the feed roll arms 108 and 110 respectively, and at their other ends to frame members (not shown) bias the upper conveyor assembly 60 downwards towards the fixed lower conveyor assembly 62.

Figure 3:
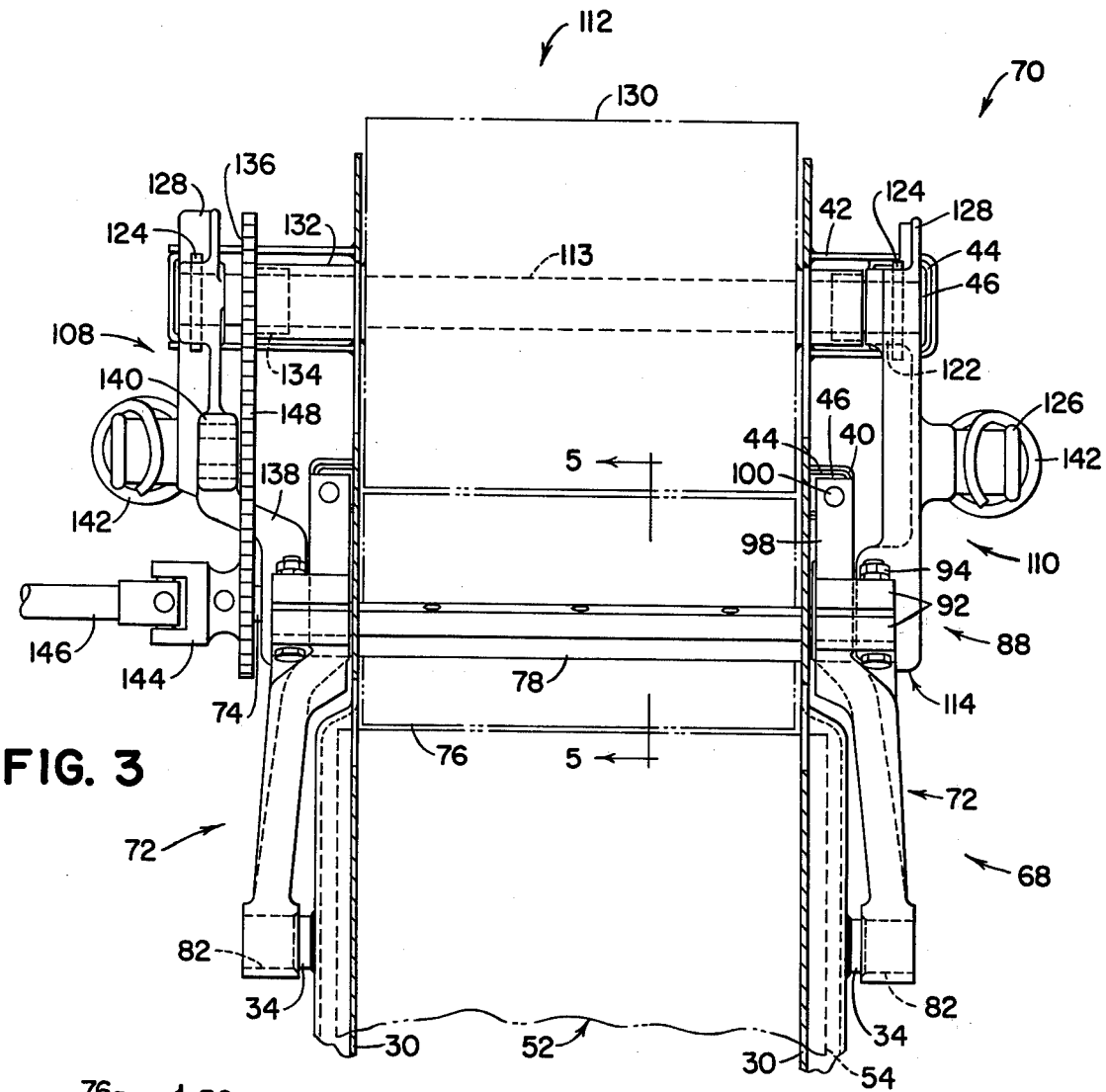
FIG. 3 is a semi-schematic partial top view of the upper feeding conveyor assembly taken approximately on line 3—3 of FIG. 2, but with an anti-carryover shield normally supported by a transverse leveler shaft removed.

The drive input to the feed rolls is conventional and includes a universal joint and sprocket assembly 144 rigidly attached to the downstream upper feed roll shaft 74 at its left-hand end and coupled or connected to an extension 146 (shown partially in FIG. 3) of the forage harvester drive train. The downstream feed roll 76 is thus driven directly while power is transmitted to the upstream feed roll 130 through the sprocket assemblies 144 and 136 by means of a conventional drive chain 148. In normal forage harvesting operation, the direction of rotation of the feed rolls 64, 66, 76 and 130 is, of course, as shown in FIG. 2 but conventional means (not shown), connected to the drive train extension 146, are provided for selectively reversing the driven direction of the rolls.

In operation the forage harvester is advanced over a field of crop and the harvesting unit 14 delivers crop material to the bite 150 between the upper and lower upstream feed rolls 130 and 64 respectively and material is fed downstream between the upper and lower conveyor assemblies 60 and 62 respectively. As can be seen in FIG. 2, the uppermost surfaces of fixed lower rolls 64 and 66 and the shear bar assembly 56 are approximately in line and form a conveying surface for feeding material approximately radially to the cutterhead cylinder 54. In FIG. 2 the upper conveyor assembly 60 is shown in a closed, at rest position—that is as if no crop was being conveyed and with the upstream feed roll 130 effectively "downstopped" through the engagement of the feed roll arms 108 and 110 with the upstream downstop bolsters 46 in their brackets 42 and with the downstream upper feed roll 76 downstopped through engagement of the adjusting screw 100 with the downstream downstop bolsters 46 in their brackets 40. When crop material flows both rolls will float, being raised from their stops by the pressure of the crop material mat, the upper conveyor assembly 60 as a whole and the downstream feed roll assembly 68 being anchored by and pivoting about the opposite pivots 34, while the low friction pivot between the downstream and upstream roll assemblies, 68 and 70 respectively, provided by the anti-friction bearing 86 permits the upstream assembly 70 to find its own level. As can be seen from FIG. 2, the line of action of the spring 142 will approximately perpendicularly bisect a line joining the centers of the downstream and upstream upper feed rolls 76 and 130 respectively over a range of depths of crop mat being conveyed, so that each roll applies approximately equal pressure to the mat and is approximately equally responsive (under the restraint of the spring 142) to overall longitudinal variations in the thickness of the crop mat.

The adjusting screw 100 is adjusted as desired to set the minimum downstopped clearance between the downstream feed roll 76 and 66 according to particular operating conditions. Such adjustment will necessarily raise or lower the downstream end of the feed roll arms 108 and 110 (rear hub 114), but it will be noted that the upstream upper feed roll 130 is downstopped immediately beneath its axis so that adjustment of the downstream downstop causes only a rocking of the feed roll arms 108 and 110 on their downstop bolster 46 so that the effect of the adjustment on feed roll opening between the upstream feed rolls is insignificant. In any unusual operating condition in which the rear upper feed roll 76 is deflected upwards excessively in relation to the forward upper feed roll 130, effectively displacing the feed roll arms 108 and 110 somewhat rearwardly, the forward extension 128 of the feed roll arms maintains contact between the feed roll arms and the upstream downstop bolster 46 if required.

Although, in general, the upper feed rolls can float upwards independently to accommodate longitudinally uneven flows of material, it is desirable that the downstream rolls 66 and 76 be prepared when they are about to receive an unusually thick mat portion conveyed rearwardly by the upstream rolls 64 and 130. This may happen for example when the feed rolls have been reversed to clear a blockage and the sheared butt-end of a crop mat is represented through the feed rolls, and the mat may present an end face too deep to be accepted by the downstream feed rolls. This problem is overcome through the provision of the differential stop 96 which ensures that any increase in feed opening between the upstream rolls 130 and 64 beyond a certain minimum (about ¾ of an inch has been found to be effective for example) is thereafter accompanied by a corresponding opening or increase of opening between the downstream feed rolls 76 and 66, due to the engagement between the differential stops 96 and the upper surface of the feed roll arms 108 and 110. Upon such engagement, further upward rotation of the feed roll arms 108 and 110 relative to the radius arms 72 is prevented and the upper conveyor assembly 60 pivots upwards as a unit about the pivots 34 so that the opening between the downstream feed rolls 76 and 66 is increased to assist those rolls in receiving the new flow of crop material. Thereafter, of course, the upper conveyor assembly can flex, the feed roll arms 108 and 110 rocking, as it were, to adjust to longitudinal variations in the thickness of the crop mat subject always to the limitation that if the upstream feed roll opening is caused to be differentially significantly greater than the downstream feed roll opening momentarily, the differential stop 96 comes into effect to adjust the downstream feed roll height accordingly.

The coupled tandem arrangement of the two generally U-shaped rigid subframes represented by the downstream and upstream upper feed roll assemblies, 68 and 70 respectively, provides an articulated upper conveyor assembly 60 which is very resistant to feed roll cocking or lateral misalignment due to lateral unevenness in the crop material mat being conveyed. In the upstream feed roll assembly 70 the rigid connection between the opposite feed roll arms 108 and 110 and the torsionally stiff dead shaft 113 give it the stability to resist a laterally offset cocking force effective on the upstream feed roll 130 and transfer it through the feed roll arm pivot hubs 114 to the subframe represented by the downstream feed roll assembly 68. In the latter, frame rigidity results from the rigidly clamped non-circular cross section connection between the strong transverse leveler shaft 78 and the opposite radius arms 72, which also, of course, resists any cocking force applied to the downstream feed roll 76. As can be seen from the drawings (FIGS. 2 and 3) the generous spread of the clamp portions 88 of the radius arms 72 along the length of the ends of the leveler shaft 78 contributes to a rigid and stable attachment of the leveler shaft 78 to the radius arms 72. The length of the clamp ears 92 is preferably at least equal to the major cross-sectional dimension of the leveler shaft 78. Clearly, in such a tandem arrangement both subframes are required to be rigid if the upstream roll is to be prevented from cocking.

It is inevitable that some crop material is not discharged immediately into the auger conveyor 18 but is carried around by the cylinder 54 within the cylinder housing including the casing 57. The latter, of course, must be terminated far enough above the shear bar assembly 56 to allow room for up and down floating movement of the downstream feed roll 76 and feeding of incoming crop material to the cylinder 54. Consequently, some carried-over crop material is discharged into the downstream upper feed roll 76 at this point and is deflected upwards and forwards by it. But the anti-carryover shield 80, which, of course, moves with the roll 76, contains this material and redirects it downwards back into the crop mat between the upper feed rolls. The resilient flap 106, its ends closely hugging the side walls 30 and its rearward edge remaining close to the outer surface of the casing member 57 as the upper conveyor articulates, serves as a seal to minimize crop material loss particularly in dry conditions when the "blower" effect of the cylinder could cause wide dispersal of material through the gap above the downstream feed roll 76.

As can be seen, the invention provides an articulated conveyor for the feeding system of a forage harvester which may be embodied, as here disclosed, in an assembly comprising only a small number of simple relatively low cost parts without extraneous linkages and sliding joints (with their potential for lost-motion-producing wear) but rather with a small number of low friction pivoted joints—an assembly providing the flexibility to respond rapidly and accommodate widely fluctuating material flows efficiently and conveniently.

We claim:

1. In a forage harvester having a forward mounted harvesting unit, a cutterhead and a feeding assembly including a body and opposite generally fore-and-aft extending side walls and cooperating upper and lower conveyor assemblies for receiving crop material from the harvesting unit and conveying it rearwardly in a mat between the conveyor assemblies for delivery to the cutterhead, the upper conveyor assembly comprising:

a pair of opposite radius arms, each arm extending fore-and-aft adjacent an opposite side wall and supported by the body for pivotal movement about a transverse axis;

a first feed roll adjacent the cutterhead extending transversely between the opposite side walls and rotatably supported by and between the radius arms forward of the pivotal support of said arms;

a stiff transverse leveler shaft, resistant to torsional and bending deflection and extending between and directly and rigidly attached to the opposite radius arms external to the periphery of the first feed roll, the leveler shaft cooperating with the opposite radius arms to form a rigid frame pivoted to the body for resisting relative rotational deflection between the radius arms and maintaining the transverse alignment of the first feed roll; and bias means for urging the upper conveyor towards the lower conveyor assembly and compressing the mat.

2. The invention defined in claim 1 wherein the leveler shaft has a shaped cross section having a major dimension and the rigid attachment of the transverse leveler shaft comprises releasable clamping means included in each opposite radius arm and extending axially in relation to the shaft and embracing the shaft closely over a length at least equal to the major dimension of the shaft cross section.

3. The invention defined in claim 1 and further including a transversely extending shield partially wrapping a forward upper portion of the first feed roll and supported by the leveler shaft.

4. The invention defined in claim 1 and further comprising:

a pair of opposite feed roll arms each extending fore-and-aft adjacent an opposite side wall, and each connected to one of the respective opposite radius arms adjacent the first feed roll, said connection permitting pivoting movement of the feed roll arms relative to the radius arms about a transverse pivot axis;

a forward feed roll shaft carried by and extending between the feed roll arms forward of the first feed roll and a second feed roll journaled on said shaft.

5. The invention defined in claim 4 wherein the forward feed roll shaft is rigidly attached adjacent its opposite ends to the respective feed roll arms, said arms and shaft cooperating to form a rigid frame for maintaining the alignment of the second feed roll.

6. The invention defined in claim 4 and further including stop means for limiting the upward pivoting movement of the feed roll arms in relation to the radius arms.

7. The invention defined in claim 6 and further comprising first and second stops carried by the body for engaging and limiting downward movement of the radius arms and feed roll arms, respectively, and wherein said stops are so disposed that from a condition in which both downstops are engaged, the feed roll arm may be rotated upwards a finite distance from said second stop before engagement of the pivot limiting means between the feed roll arm and the radius arm.

8. The invention defined in claim 1 wherein the radius arms extend partially alongside the cutterhead.

9. In a forage harvester having components including a harvesting unit, a cutterhead for reducing crop particle size and a feeding assembly having a frame including opposite side walls and including cooperating opposing first and second conveyor assemblies for receiving crop material from the harvesting unit at an upstream end conveying it between said conveyor assemblies and delivering it to the cutterhead at a downstream end and a drive train connectible to a power source for driving the components of the harvester, the first conveyor assembly comprising:

a downstream feed roll assembly including a pair of opposite radius arms extending adjacent the side walls, each supported by the frame for pivoting about a transverse pivot axis, a downstream feed roll rotatably supported by and between the radius arms upstream of the pivot axis and a leveler shaft extending transversely between and rigidly attached to the opposite radius arms upstream of the pivot axis and external to the feed roll, the leveler shaft cooperating with the radius arms to provide a torsionally stiff frame for limiting cocking of the feed roll when the roll is subject to loading unequally distributed along its length;

a first stop carried by the frame for engaging the downstream feed roll assembly for limiting its pivotal movement towards the second conveyor assembly;

an upstream feed roll assembly including a pair of opposite feed roll arms, each extending adjacent an opposite side wall and each connected to a radius arm adjacent the downstream feed roll for pivoting about a transverse axis with respect to said radius arms, a second leveler shaft extending between and rigidly attached to the feed roll arms and an upstream feed roll journaled on the second leveler shaft;

means for biasing the upstream and downstream feed roll assemblies towards the second conveyor assembly; and drive means connected to the drive train for rotating the feed rolls.

10. The invention defined in claim 9 wherein the first leveler shaft extends closely adjacent the periphery of the downstream feed roll and with respect to the axis of said feed roll is disposed remote from the second conveyor assembly.

11. The invention defined in claim 10 wherein the peripheries of the downstream feed roll and the cutterhead are closely adjacent and at least some of the crop material is carried over by the cutterhead and released adjacent to and engaged by the downstream feed roll and further including a transversely extending shield wrapping an upper portion of the downstream feed roll and supported by the first leveler shaft and extending between the downstream and upstream feed rolls for redirecting crop material engaged by the downstream feed roll down into the crop mat.

12. The invention defined in claim 9 wherein each opposite radius arm includes clamp means for rigidly securing the first leveler shaft.

13. The invention defined in claim 12 wherein each clamp means includes a yoke having a transverse bore for receiving and clamping the first leveler shaft, the bore having an internal surface and the leveler shaft having two spaced external clamping surfaces shaped to mate with said internal clamping surfaces.

14. The invention defined in claim 9 and further including adjustment means extending between the downstream feed roll assembly and the first stop for selectively varying the stopped position of said assembly and hence of the downstream feed roll with respect to the second conveyor assembly.

15. The invention defined in claim 9 wherein the first stop engages one of the radius arms upstream of the axis of the downstream feed roll.

16. The invention defined in claim 9 and further including a second stop carried by the frame and engaging the upstream feed roll assembly for limiting movement of said feed roll assembly towards the second conveyor assembly.

17. The invention defined in claim 16 wherein the second stop engages one of the upstream feed roll arms and the bias means engages said feed roll arm between its point of engagement of the second stop and said pivotal connection with the radius arm.

18. The invention defined in claim 16 wherein the second stop engages one of the feed roll arms of the upstream feed roll assembly closely adjacent the axis of the upstream feed roll.

19. The invention defined in claim 9 and further including stop means for limiting pivoting movement of the feed roll arms in relation to the radius arms in a direction corresponding to movement of the upstream feed roll away from the second conveyor assembly.

20. The invention defined in claim 9 wherein the drive train is drivingly connected to the downstream feed roll and further including secondary drive means connected between the upstream and downstream feed rolls for driving the upstream roll.

21. The invention defined in claim 20 wherein the opposite pivotal connections between the respective radius arms and feed roll arms are coaxial with the downstream feed roll.

22. The invention defined in claim 9 wherein said bias means is a helical tension spring having a longitudinal center line and said center line passes approximately midway between the centers of the upstream and downstream feed rolls.

23. In a forage harvester having components including a generally cylindrical cutterhead rotatable about a transverse axis for reducing crop particle size and a feed assembly having a frame including opposite side walls and including cooperating opposing first and second conveyor assemblies for receiving crop material at an upstream end and conveying it between said conveyor assemblies and delivering it to the cutterhead at a downstream end and a drive train connectible to a power source for driving the components of the forage harvester, the first conveyor assembly comprising:

a downstream feed roll assembly including a pair of opposite radius arms extending adjacent the side walls, each supported by the frame for pivoting about a transverse pivot axis, and a downstream feed roll rotatably supported between the radius arms upstream of the pivot axis;

a first stop carried by the frame for engaging the downstream feed roll assembly for limiting its pivotal movement towards the second conveyor assembly;

an upstream feed roll assembly including a pair of opposite feed roll arms, each extending adjacent an opposite side wall and each connected to one of the opposite radius arms adjacent the downstream feed roll for pivoting about a transverse axis with respect to said radius arms and an upstream feed roll rotatably supported by and between the feed roll arms;

a second stop carried by the frame for engaging the upstream feed roll assembly for limiting its movement towards the second conveyor assembly;

means for biasing the upstream and downstream feed roll assemblies towards the second conveyor assembly; and drive means connected to the drive train for rotating the feed rolls.

24. The invention defined in claim 23 and further including adjustment means extending between one of the radius arms and the first stop for selectively varying the stopped position of said radius arm and hence of the downstream feed roll with respect to the second conveyor assembly.

25. The invention defined in claim 23 wherein the first stop engages one of the radius arms upstream of the axis of the downstream feed roll.

26. The invention defined in claim 23 wherein the second stop engages one of the upstream feed roll arms and the bias means engages said feed roll arm between its point of engagement of the second stop and said pivotal connection with the radius arm.

27. The invention defined in claim 23 wherein the second stop engages the feed roll arm adjacent the axis of the upstream feed roll.

28. The invention defined in claim 23 and further including stop means for limiting pivoting movement of the feed roll arms in relation to the radius arms in a direction corresponding to movement of the upstream feed roll away from the second conveyor assembly.

29. The invention defined in claim 28 wherein the pivot limiting stop means is carried by one of the radius arms and engages the feed roll arm connected to it.

30. The invention defined in claim 23 wherein the drive train is drivingly connected to the downstream feed roll and further including secondary drive means connected between the upstream and downstream rolls for driving the upstream roll.

31. The invention defined in claim 30 wherein the pivotal connections between the respective radius arms and feed roll arms are coaxial with the downstream feed roll.

32. The invention defined in claim 23 wherein said bias means is a helical tension spring having a longitudinal center line and said center line passes approximately midway between the centers of the upstream and downstream feed rolls.

* * * * *